(12) United States Patent
Lehtonen

(10) Patent No.: US 9,199,580 B2
(45) Date of Patent: Dec. 1, 2015

(54) PURSE SECURING STRAP

(71) Applicant: Donna L. E. Lehtonen, King (CA)

(72) Inventor: Donna L. E. Lehtonen, King (CA)

(*) Notice: Subject to any disclaimer, the term of this patent is extended or adjusted under 35 U.S.C. 154(b) by 0 days.

(21) Appl. No.: 13/947,976

(22) Filed: Jul. 22, 2013

(65) Prior Publication Data

US 2015/0021369 A1   Jan. 22, 2015

(51) Int. Cl.
  *B60R 7/04*  (2006.01)
(52) U.S. Cl.
  CPC ...................... *B60R 7/043* (2013.01)
(58) Field of Classification Search
  CPC ............ A45C 13/30; A45F 5/00; A45F 3/14; B60R 7/043
  USPC .................................................. 224/275, 572
  See application file for complete search history.

(56) References Cited

U.S. PATENT DOCUMENTS

| 5,104,076 | A | * | 4/1992 | Goodall, Jr. ............... 248/205.2 |
| 5,383,588 | A | * | 1/1995 | Kazel ............................ 224/275 |
| 6,966,470 | B1 | * | 11/2005 | Charlton ....................... 224/407 |
| 7,841,453 | B2 | * | 11/2010 | Gold et al. .................... 190/102 |
| 2003/0121944 | A1 | * | 7/2003 | Scanlan et al. ................ 224/409 |
| 2008/0035687 | A1 | * | 2/2008 | Beaulieu ....................... 224/275 |
| 2011/0248057 | A1 | * | 10/2011 | Schmitz ........................ 224/275 |

* cited by examiner

*Primary Examiner* — Brian D Nash
*Assistant Examiner* — Corey Skurdal
(74) *Attorney, Agent, or Firm* — Livingston Loeffler, P.A.; Edward M. Livingston, Esq.; Bryan L. Loeffler, Esq.

(57) ABSTRACT

A purse securing device (1) having an upper strap (4) having a first strap (5) and a second strap (6) that wrap around a head rest (7) or rear portion (8) of the vehicle seat (2). A lower strap (9) extends vertically downward from the upper strap. When laid flat the upper strap and lower strap create a substantially T-shape. The lower strap attaches to a purse to prevent the purse from tipping over.

2 Claims, 2 Drawing Sheets

PURSE SECURING STRAP

FIELD OF THE INVENTION

This invention relates to purses and hand bags, and more particularly, a device to secure a purse from sliding off of a seat of a vehicle onto the floorboard or tipping over on a seat and spilling the contents of the purse.

BACKGROUND OF THE INVENTION

Purses and handbags have always been a convenient and preferred method for female to carry and transport personal items. When females drive, they normally keep their purses on the passenger seat next them. If the bag is open and the driver makes a quick stop the purse will tip over and/or slide off the seat, thereby causing the contents of the purse to be spilled.

Therefore, a need exists for an invention that will secure a purse to prevent it from tipping over or falling on the floorboard of a vehicle while driving.

SUMMARY OF THE INVENTION

The primary object of the present invention is to provide a purse securing device that secures a purse a seat of a vehicle to prevent it from tipping over or falling on the floorboard of a vehicle while driving The present invention fulfills the above and other objects by providing a purse securing device having straps that wrap around a head rest or rear portion of a seat of a vehicle and then wraps around handles of a purse or hand bag. An additional feature of the device is that it is preferably constructed from fabric straps that allow it to be left on the vehicle seat, thereby allowing an individual to sit in the seat and not be affected by the strap.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
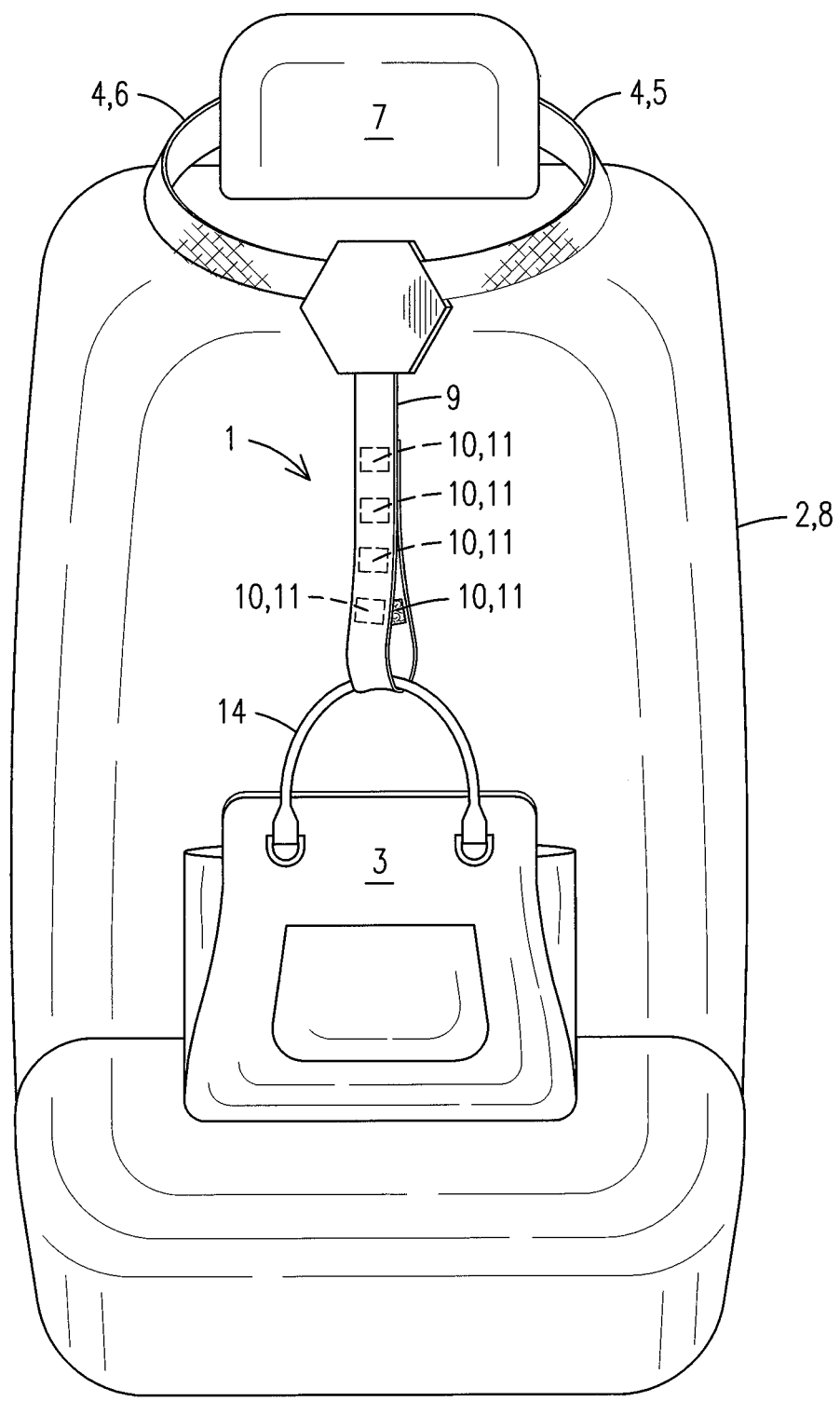
FIG. 1 is a perspective view of a purse securing device of the present invention attached to a vehicle seat and a purse.
Figure 2:
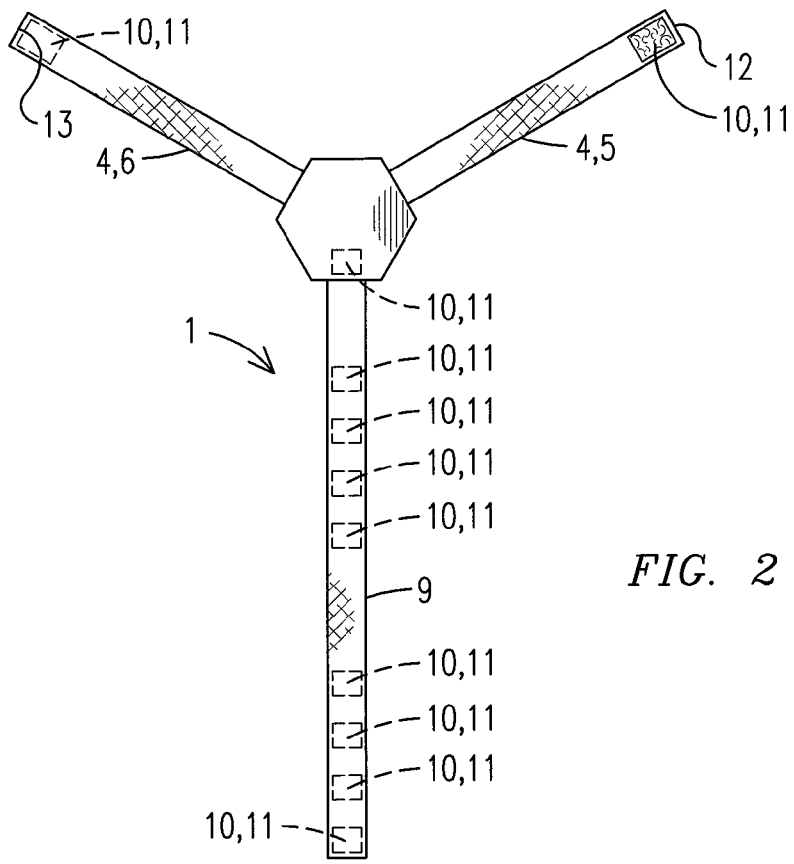
FIG. 2 is a front view of a purse securing device of the present invention.
Figure 3:
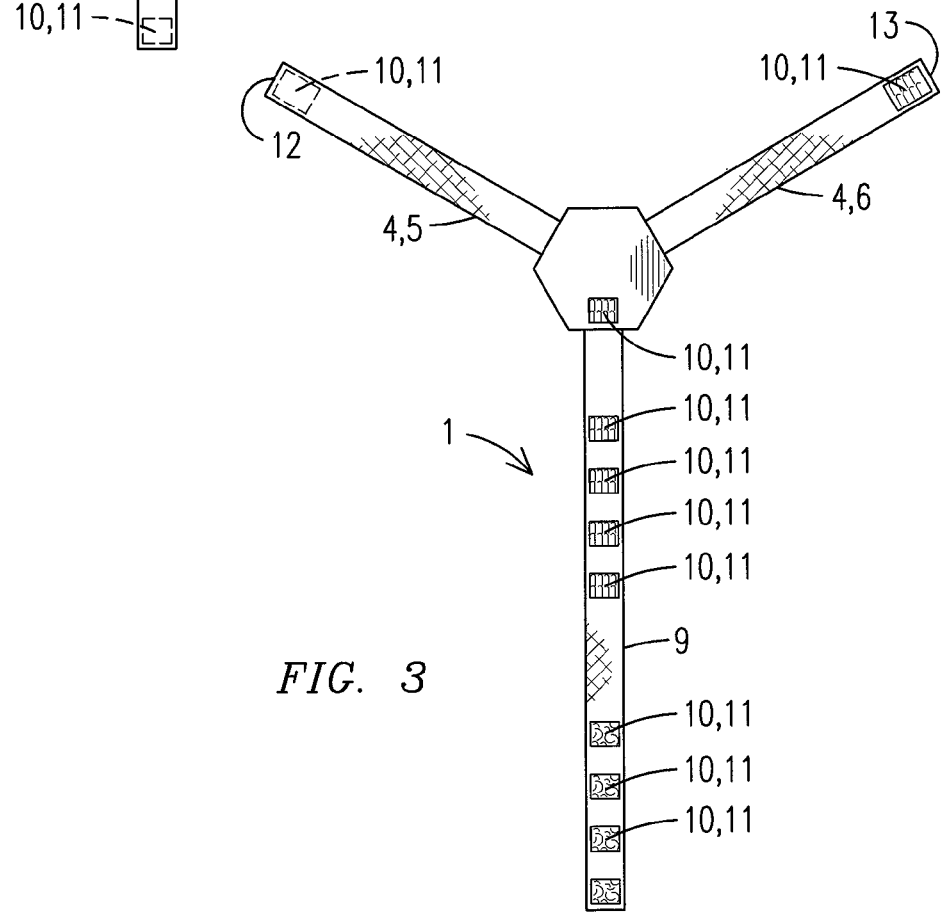
FIG. 3 is a rear perspective view of a purse securing device of the present invention.

For purposes of describing the preferred embodiment, the terminology used in reference to the numbered components in the drawings is as follows:

1. purse securing device, generally
2. vehicle seat
3. purse
4. upper strap
5. first strap
6. second strap
7. head rest
8. rear portion of a vehicle seat
9. lower strap
10. attachment means
11. hook and loop fastener
12. first end
13. second end
14. handle of purse With reference to FIGS. 1, 2 & 3, a view of a purse securing device 1 of the present invention attached to a vehicle seat 2 and a purse 3, a front view of the present invention and a rear view of the present invention, respectively, is illustrated. The purse securing device 1 comprises an upper strap 4 having a first strap 5 and a second strap 6 that wrap around a head rest 7 or rear portion 8 of the vehicle seat 2. A lower strap 9 extends vertically downward from the upper strap 4. When laid flat the upper strap 4 and lower strap 9 create a substantially T-shape.

One or more attachment means 10, such as a hook and loop fastener 11 snap, button and so forth, are located on a first end 12 of the first strap 5 and a second end 13 of the second strap 6 to secure the upper strap 4 to the head rest 7 or rear portion 8 of the vehicle seat 9.

One or more attachment means 10, such as a hook and loop fastener 11 snap, button and so forth, are located on the lower strap 9 that extends vertically downward so the lower strap 9 can be looped around one or more handles 14 of a purse 3, thereby securing the purse 3 to the vehicle seat 2 so the purse 3 will not turn over or slide off of the vehicle seat 2.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A purse securing device for securing a purse to a vehicle seat comprising:

a first rectangular-shaped strap and a second rectangular-shaped strap each extending upward at opposing angles from a single rectangular-shaped lower strap, thereby creating a Y-shape between the first rectangular-shaped strap, second rectangular-shaped strap and lower rectangular-shaped strap that when laid flat is a planar surface;

said lower rectangular-shaped strap having a flat unencumbered end;

a hook and loop fastener located on a first end of the first rectangular-shaped strap to secure the first rectangular-shaped strap to a head rest of a vehicle seat;

a hook and loop fastener on a second end of the second rectangular-shaped strap to secure the second rectangular-shaped strap to a head rest of a vehicle seat;

a plurality of hook and loop fasteners located on a surface of the lower rectangular-shaped strap so that the lower rectangular-shaped strap may be looped around one or more handles of a purse, thereby being folded upon itself and securing the lower rectangular-shaped strap around the one or more handles of the purse so that the flat unencumbered end of the lower rectangular-shaped strap lays flat against the surface of the lower rectangular-shaped strap; and said plurality of hook and loop fasteners located on the surface of the lower rectangular-shaped strap being spaced apart from each other to allow the length of the lower rectangular-shaped strap to be adjusted to accommodate a height of a purse being secured.

2. A method for securing a purse on a vehicle seat using a purse securing device comprising a first rectangular-shaped strap and a second rectangular-shaped strap each extending upward at opposing angles from a single rectangular-shaped lower strap, thereby creating a Y-shape between the first rectangular-shaped strap, second rectangular-shaped strap and lower rectangular-shaped strap that when laid flat is a planar surface, said lower rectangular-shaped strap having a flat unencumbered end, a hook and loop fastener located on a first end of the first rectangular-shaped strap to secure the first rectangular-shaped strap to a head rest of a vehicle seat, on a second end of the second rectangular-shaped strap to secure the second rectangular-shaped strap to a head rest of a vehicle seat, and a plurality of hook and loop fasteners located on a surface of the lower rectangular-shaped strap, and said plurality of hook and loop fasteners located on the surface of the lower rectangular-shaped strap being spaced apart from each other; said method comprising the steps of:

a. attaching the first rectangular-shaped strap and the second rectangular-shaped strap to a head rest of a vehicle seat using the hook and loop fastener located on the first end of the first rectangular-shaped strap and the hook and loop fastener located on the second end of the second rectangular-shaped strap;

b. draping the lower rectangular-shaped strap on a front surface of the vehicle seat;

c. looping the lower rectangular-shaped strap around one or more handles of a purse;

d. folding the lower rectangular-shaped strap backward upon itself;

e. adjusting the length of the lower rectangular-shaped strap to accommodate a height of a purse being secured on the vehicle seat using the plurality of hook and loop fasteners located on the lower rectangular-shaped strap; and f. securing the lower rectangular-shaped strap around one or more handles of the purse using the plurality of hook and loop fasteners located on the lower rectangular-shaped strap so that the flat unencumbered end of the lower rectangular-shaped strap lays flat against the surface of the lower rectangular-shaped strap.

* * * * *